United States Patent
Kuroki

(10) Patent No.: US 7,782,320 B2
(45) Date of Patent: Aug. 24, 2010

(54) INFORMATION PROCESSING METHOD AND INFORMATION PROCESSING APPARATUS

(75) Inventor: Tsuyoshi Kuroki, Cambridge, MA (US)

(73) Assignee: Canon Kabushiki Kaisha, Tokyo (JP)

( * ) Notice: Subject to any disclaimer, the term of this patent is extended or adjusted under 35 U.S.C. 154(b) by 735 days.

(21) Appl. No.: 11/737,903

(22) Filed: Apr. 20, 2007

(65) Prior Publication Data
US 2007/0252833 A1    Nov. 1, 2007

(30) Foreign Application Priority Data
Apr. 27, 2006    (JP) .............................. 2006-124329

(51) Int. Cl.
*G06T 15/00*    (2006.01)
(52) U.S. Cl. .................. 345/427; 345/629; 345/634; 396/374
(58) Field of Classification Search ................ 345/427, 345/629, 634; 396/374
See application file for complete search history.

(56) References Cited

U.S. PATENT DOCUMENTS

| | | | |
|---|---|---|---|
| 6,970,166 B2 | 11/2005 | Kuroki et al. ................ | 345/428 |
| 7,391,424 B2 * | 6/2008 | Lonsing ........................ | 345/633 |
| 7,411,588 B2 * | 8/2008 | Kuroki et al. ................ | 345/428 |
| 2005/0212801 A1 | 9/2005 | Kuroki et al. ................ | 345/428 |
| 2007/0006091 A1 | 1/2007 | Sakagawa et al. ........... | 715/771 |
| 2007/0024610 A1 | 2/2007 | Katano et al. ................ | 345/418 |

FOREIGN PATENT DOCUMENTS

JP    3363861 B2    10/2002

* cited by examiner

*Primary Examiner*—Phu Nguyen
(74) *Attorney, Agent, or Firm*—Fitzpatrick, Cella, Harper & Scinto

(57) ABSTRACT

A virtual space image including a feature point is generated by executing software which generates a virtual space image on the basis of a viewpoint and receives a variation upon changing the position and orientation of the viewpoint. The position and orientation of the viewpoint are obtained by using the generated virtual space image. The position and orientation of the viewpoint are acquired. A variation is obtained on the basis of the position and orientation acquired in step S204 and those obtained in step S203. The variation is input to the software. The software updates the position and orientation of the viewpoint on the basis of the variation and outputs a virtual space image generated on the basis of a viewpoint having the updated position and orientation.

9 Claims, 8 Drawing Sheets

F I G. 10
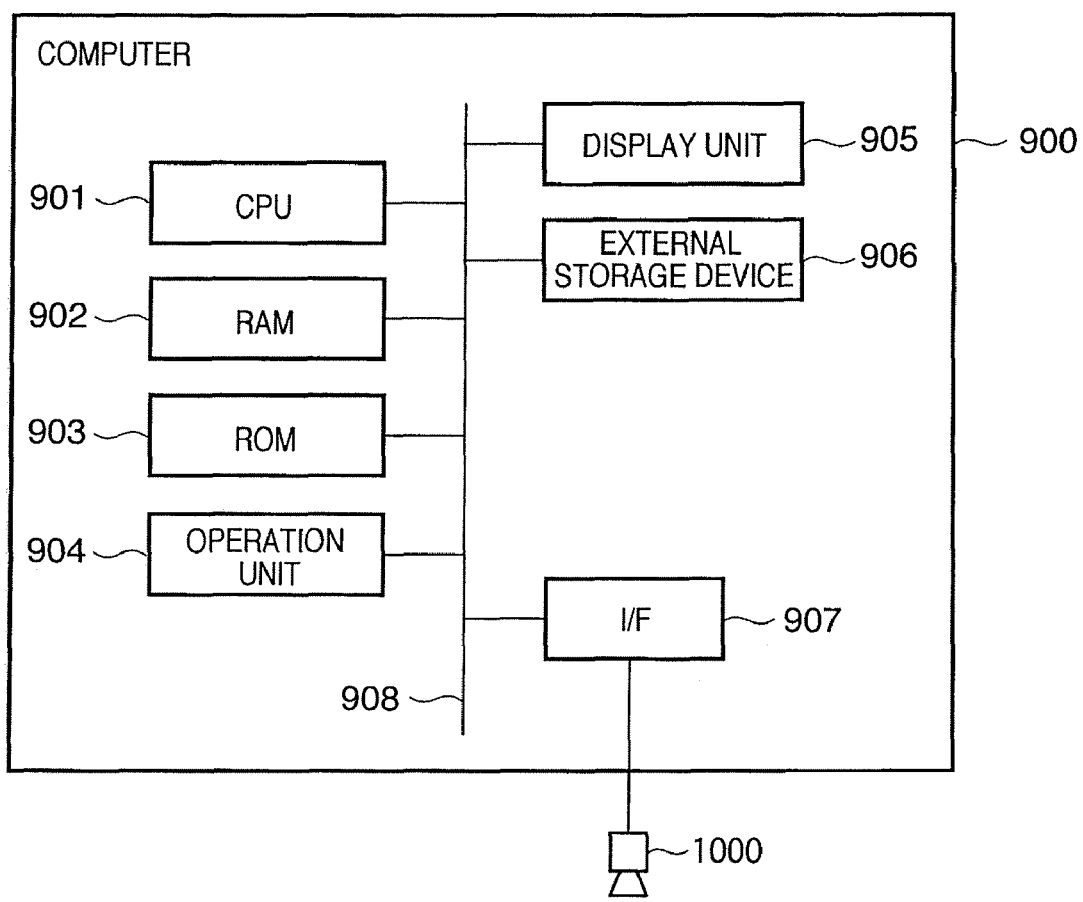

INFORMATION PROCESSING METHOD AND INFORMATION PROCESSING APPARATUS

BACKGROUND OF THE INVENTION

1. Field of the Invention

The present invention relates to a computer graphics technology.

2. Description of the Related Art

Computer Graphics (CG) is a technique which uses a computer to render a virtual world onto a screen. CG software causes a computer to create CG. CG software is used in various fields for example, architectural design, product design, and image production such as in film production.

CG can be regarded as an image obtained by capturing a virtual world with a virtual camera. To allow a user to see the virtual world from free viewpoints, CG software normally incorporates a mechanism of moving the viewpoint of the virtual camera via an input device such as a mouse or a keyboard.

In the CG software, the viewpoint is manipulated by inputting a change value from the current position and orientation of the viewpoint. In the virtual world, the viewpoint has a total of six degrees of freedom: three degrees of freedom in position and three degrees of freedom in orientation. In an XYZ orthogonal coordinate system, therefore, the six degrees of freedom include positions on X-, Y-, and Z-axes and rotations about them. The viewpoint can be moved continuously by inputting a change value from the current six degrees of freedom of the viewpoint.

CG software uses a keyboard or a mouse to input the change value of six degrees of freedom. The mouse can input only two degrees of freedom (i.e. vertical and horizontal positions). Thus, many CG software applications enable input of six degrees of freedom by, for example, combining the keyboard and mouse. For instance, when the user manipulates the mouse while pressing the X key on the keyboard, rotation about the X-axis changes. Alternatively, a six-degree-of-freedom mouse capable of inputting six degrees of freedom can be used to input the change value of six degrees of freedom.

Recently, a technique called a VR (Virtual Reality) system has been employed in many fields. The VR system presents a CG image created by a computer to a user who is wearing an HMD (Head-Mounted Display), thereby making him/her perceive a virtual space as reality. In the VR system, the CG presented to the user changes in response to movements of his/her head. Hence, the user can feel as though the CG were present in the user's vicinity.

Another technique has also been developed recently, in which a CG image is superimposed on a physical space image and presented to a user who is wearing an HMD. With this technique, the user can see a physical world unavailable using the VR system. This is called an MR (Mixed Reality) system (Japanese Patent Registration No. 3363861).

In either the VR system or MR systems, the position and orientation information of the HMD is acquired by using a six-degree-of-freedom sensor such as a magnetic sensor and replaced with the position and orientation of the viewpoint of the virtual camera that renders CG, thereby rendering the virtual world image seen from the user's viewpoint.

The VR system and MR system can also be constructed using CG software as a rendering unit because they use CG.

To construct a VR system using CG software as a CG rendering unit, a mechanism for receiving position and orientation information from a six-degree-of-freedom sensor must be prepared in the CG software, in advance. Additionally, to cope with various six-degree-of-freedom sensors, the CG software must have a position and orientation information reception mechanism corresponding to each sensor.

Normally CG software has only a mechanism for receiving a change value as a viewpoint manipulation method. To construct a VR system using CG software as a CG rendering unit, the computer program of the CG software must be altered. Therefore construction of VR systems using CG software as a CG rendering unit is very rare.

To construct an MR system using CG software as a CG rendering unit, a mechanism for receiving position and orientation information from a six-degree-of-freedom sensor must be prepared in the CG software, in advance. In addition, the CG software must have a mechanism for receiving a physical world image and compositing it with a CG image. At the moment, no CG software with such a mechanism exists.

For the reasons described above, it is currently difficult to construct a VR system or MR system using CG software as a CG rendering unit. To construct a VR system or MR system, a CG rendering unit is generally built from the ground up for each VR system or MR system. However, if a rendering unit specific to for each VR system or MR system is built, it is impossible to make use of various functions of CG software in the VR system or MR system.

SUMMARY OF THE INVENTION

The present invention has been made in consideration of the above-described problems, and has as its object to provide a technique that allows to construction of a VR system or MR system using existing CG software as a CG rendering unit and ensures VR experience or MR experience while exploiting various functions of the CG software.

In order to achieve an object of the present invention, for example, an information processing method of the present invention comprises the following arrangement.

That is, an information processing method executed by an information processing apparatus for executing software which generates an image of a virtual space on the basis of a viewpoint set in the virtual space and receives a variation upon changing a position and orientation of the viewpoint, comprising:

a first calculation step of generating an image of a virtual space including a feature point by executing the software and obtaining the position and orientation of the viewpoint by using the generated virtual space image;

a designation step of designating a position and orientation of the viewpoint;

a second calculation step of obtaining a variation of the viewpoint on the basis of the position and orientation designated in the designation step and the position and orientation obtained in the first calculation step;

an input step of inputting the variation obtained in the second calculation step to the software to update the position and orientation of the viewpoint; and an output step of outputting a virtual space image generated on the basis of a viewpoint having a position and orientation that are updated by the software on the basis of the variation obtained in the second calculation step.

In order to achieve an object of the present invention, for example, an information processing method of the present invention comprises the following arrangement.

That is, an information processing method executed by an information processing apparatus for executing software which generates an image of a virtual space on the basis of a viewpoint set in the virtual space and receives a designation of a position and orientation upon designating a position and orientation of the viewpoint, comprising:

a first calculation step of generating an image of a virtual space including a feature point by executing the software and obtaining the position and orientation of the viewpoint by using the generated virtual space image;

a designation step of designating a position and orientation of the viewpoint;

a second calculation step of obtaining a new position and orientation of the viewpoint on the basis of the position and orientation designated in the designation step and the position and orientation obtained in the first calculation step;

an input step of inputting the new position and orientation obtained in the second calculation step to the software to update the position and orientation of the viewpoint; and an output step of outputting a virtual space image generated on the basis of a viewpoint having a position and orientation that are updated by the software on the basis of the new position and orientation obtained in the second calculation step.

In order to achieve an object of the present invention, for example, an information processing apparatus of the present invention comprises the following arrangement.

That is, an information processing apparatus for executing software which generates an image of a virtual space on the basis of a viewpoint set in the virtual space and receives a variation upon changing a position and orientation of the viewpoint, comprising:

first calculation unit adapted to generate an image of a virtual space including a feature point by executing the software and obtain the position and orientation of the viewpoint by using the generated virtual space image;

designation unit adapted to designate a position and orientation of the viewpoint;

second calculation unit adapted to obtain a variation of the viewpoint on the basis of the position and orientation designated by the designation unit and the position and orientation obtained by the first calculation unit;

input unit adapted to input the variation obtained by the second calculation unit to the software to update the position and orientation of the viewpoint; and output unit adapted to output a virtual space image generated on the basis of a viewpoint having a position and orientation that are updated by the software on the basis of the variation obtained by the second calculation unit.

In order to achieve an object of the present invention, for example, an information processing apparatus of the present invention comprises the following arrangement.

That is, an information processing apparatus for executing software which generates an image of a virtual space on the basis of a viewpoint set in the virtual space and receives a designation of a position and orientation upon designating a position and orientation of the viewpoint, comprising:

first calculation unit adapted to generate an image of a virtual space including a feature point by executing the software and obtain a position and orientation of the viewpoint by using the generated virtual space image;

designation unit adapted to designate a position and orientation of the viewpoint;

second calculation unit adapted to obtain a new position and orientation of the viewpoint on the basis of the position and orientation designated by the designation unit and the position and orientation obtained by the first calculation unit;

input unit adapted to input the new position and orientation obtained by the second calculation unit to the software to update the position and orientation of the viewpoint; and output unit adapted to output a virtual space image generated on the basis of a viewpoint having a position and orientation that are updated by the software on the basis of the new position and orientation obtained by the second calculation unit.

Further features of the present invention will become apparent from the following description of exemplary embodiments with reference to the attached drawings.

BRIEF DESCRIPTION OF THE DRAWINGS

FIG. 10 is a block diagram showing the hardware configuration of the system according to the second embodiment of the present invention.

DESCRIPTION OF THE EMBODIMENTS

Preferred embodiments of the present invention will now be described in detail in accordance with the accompanying drawings.

First Embodiment

In the technique to be described in this embodiment, conventional CG software is applied to a VR system. More specifically, a VR system is implemented by using conventional CG software which receives only a variation of the position and orientation of a viewpoint in order to change them.

Figure 1:
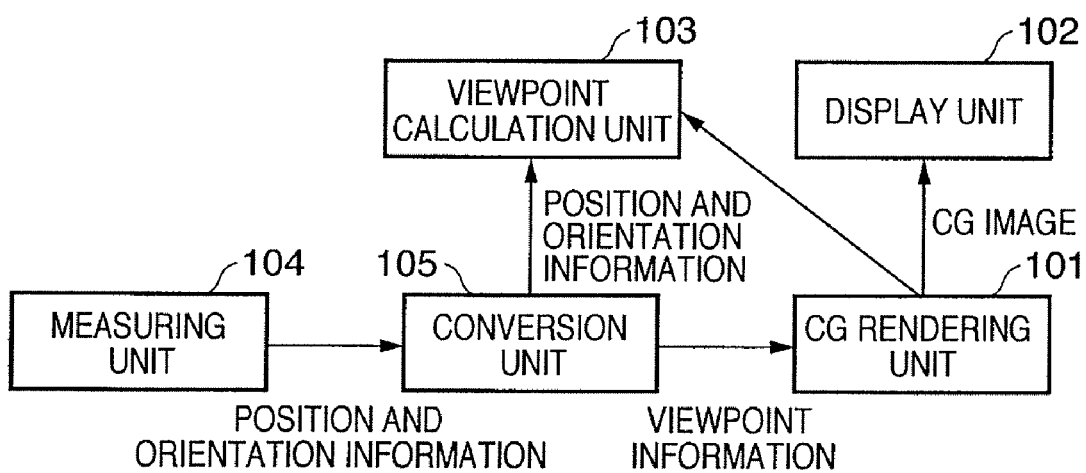
FIG. 1 is a block diagram showing the functional arrangement of a VR system according to the first embodiment of the present invention.

FIG. 1 is a block diagram showing the functional arrangement of a VR system according to this embodiment. As shown in FIG. 1, the VR system of this embodiment includes a CG rendering unit 101, display unit 102, viewpoint calculation unit 103, conversion unit 105, and measuring unit 104. Each unit will be described below.

The CG rendering unit 101 includes CG software that has a function of generating an image of a virtual space (virtual space image) on the basis of a viewpoint set in the virtual space, and a software execution unit that executes the CG software. The CG software receives a variation of the position and orientation of the viewpoint in order to change them. For example, commercially available product design CAD software or image production CG software is applicable to the CG software. Hence, the CG rendering unit 101 can be used as a single application separated from the system. In this case, the user can view the virtual world from a desired viewpoint by arbitrarily manipulating the viewpoint by using a keyboard or mouse (not shown). The CG rendering unit 101 sends the generated virtual space image to the display unit 102.

The display unit 102 includes a CRT or a liquid crystal display panel and displays the virtual space image generated by the CG rendering unit 101.

The viewpoint calculation unit 103 receives the virtual space image generated by the CG rendering unit 101 and obtains, from the virtual space image, the position and orientation of the viewpoint set in the virtual space in order to generate the virtual space image. Generally, it is impossible to acquire, from CG software, the position and orientation of the viewpoint set by the software in the virtual space in order to generate a virtual space image. In this embodiment, the position and orientation of the viewpoint are obtained from the virtual space image generated by executing the CG software. The viewpoint calculation unit 103 sends the obtained position and orientation of the viewpoint to the conversion unit 105 as position and orientation information.

Figure 8:
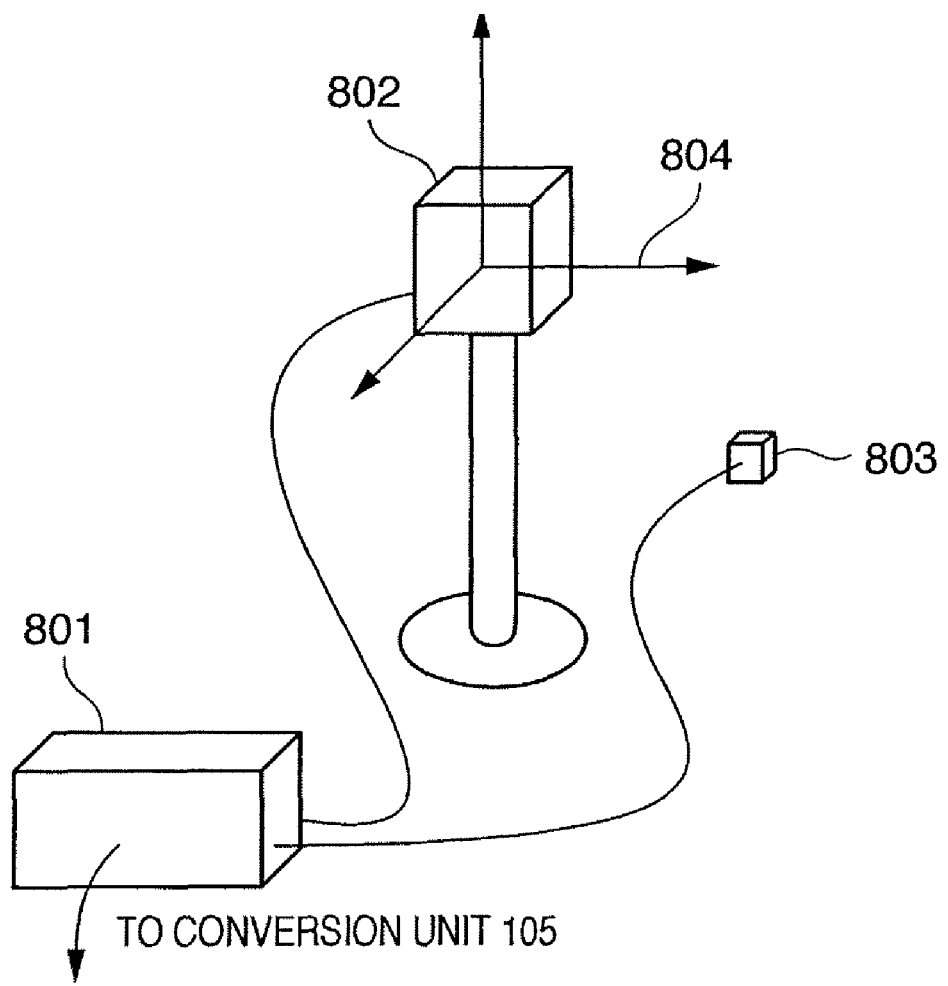
FIG. 8 is a view showing the schematic arrangement of a magnetic sensor system applicable to a measuring unit 104.

The measuring unit 104 measures the position and orientation of a manipulation tool whose position and orientation can be manipulated by the user. For example, a magnetic sensor system as shown in FIG. 8 is applicable to the measuring unit 104. FIG. 8 is a view showing the schematic arrangement of a magnetic sensor system applicable to the measuring unit 104.

Referring to FIG. 8, a magnetic field transmission source 802 generates a magnetic field around itself. A receiver 803 is used as a manipulation tool. The receiver 803 detects a magnetism corresponding to its position and orientation in the magnetic field generated by the magnetic field transmission source 802 and sends a signal (detection signal) representing the detection result to a control box 801. The control box 801 controls the operations of the magnetic field transmission source 802 and receiver 803. Upon receiving the detection signal from the receiver 803, the control box 801 obtains, on the basis of the signal, the position and orientation of the receiver 803 in a coordinate system 804 (sensor coordinate system) which defines the position of the magnetic field transmission source 802 as the origin and three axes perpendicularly crossing each other at the origin as the X-, Y-, and Z-axes.

The position and orientation obtained by the above-described arrangement are sent to the conversion unit 105 as position and orientation information. The arrangement of measuring the position and orientation of the manipulation tool by the measuring unit 104 is not particularly limited, and various arrangements can be employed.

Referring back to FIG. 1, the conversion unit 105 obtains a variation of the position and orientation of the viewpoint by using the position and orientation information received from the measuring unit 104 and those received from the viewpoint calculation unit 103 and sends the obtained variation to the CG rendering unit 101 as viewpoint information.

Upon receiving the variation, the CG rendering unit 101 updates the position and orientation of the viewpoint by adding the variation to the current position and orientation of the viewpoint and generates a virtual space image viewed from the viewpoint with the updated position and orientation, as is known. The generated virtual space image is sent to the display unit 102.

Figure 9:
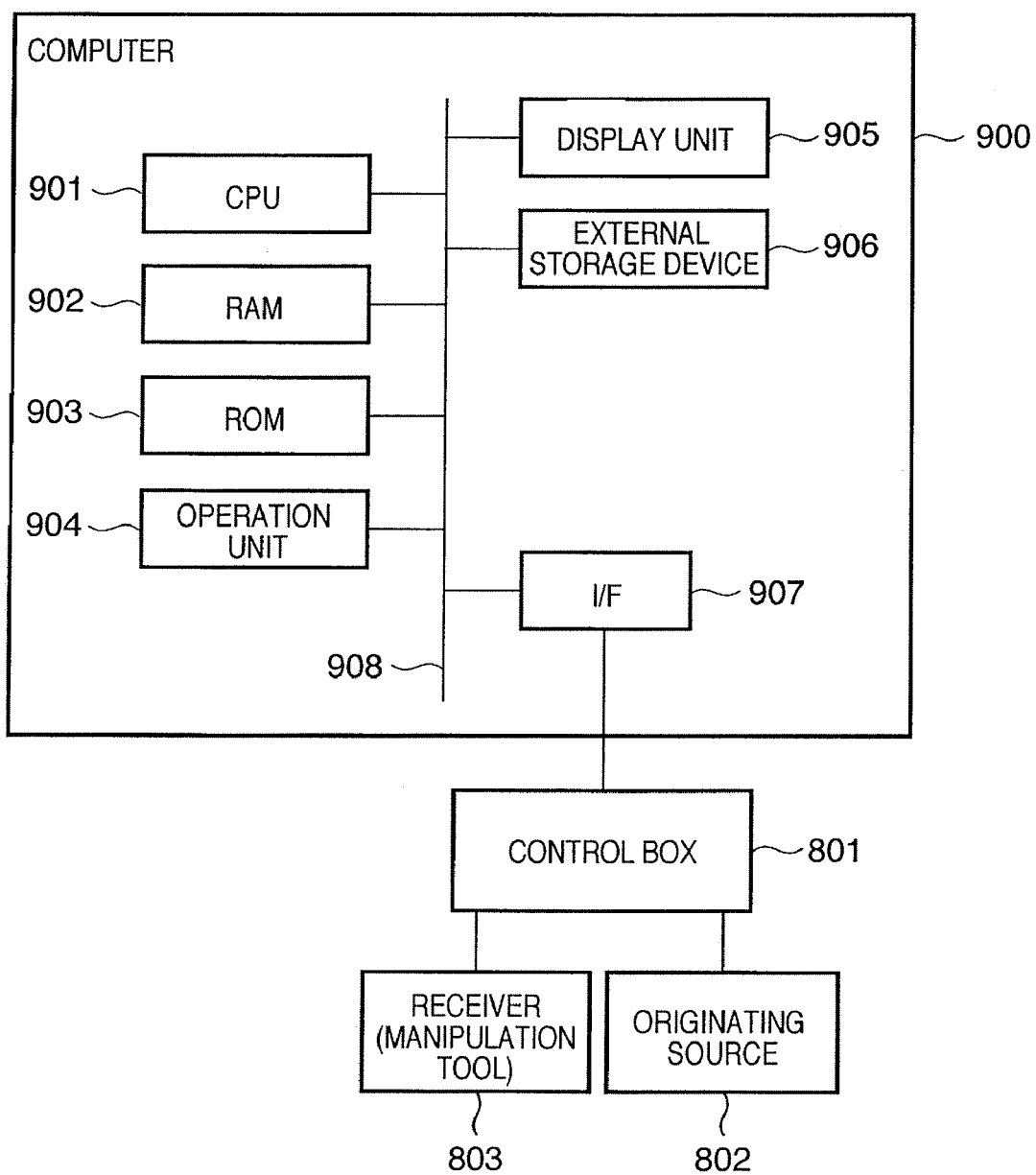
FIG. 9 is a block diagram showing the hardware configuration of the system according to the first embodiment of the present invention.

FIG. 9 is a block diagram showing the hardware configuration of the system according to the first embodiment. As shown in FIG. 9, the system of this embodiment includes a computer 900, the control box 801, the magnetic field transmission source 802, and the receiver 803 serving as the manipulation tool. The control box 801, the magnetic field transmission source 802, and the receiver 803 serving as the manipulation tool have been described above. The computer 900 will be explained below.

A CPU 901 controls the entire computer by using programs and data stored in a RAM 902 and a ROM 903. The CPU 901 also executes the process (to be described later) to be executed by the computer.

The RAM 902 has an area to temporarily store programs and data loaded from an external storage device 906 and position and orientation information received from the control box 801 via an I/F 907. The RAM 902 also has a work area to be used by the CPU 901 to execute the process. That is, the RAM 902 can provide various areas of memory for different purposes as needed.

The ROM 903 stores the setting data and boot programs of the computer.

The operator of this computer can input various kinds of instructions to the CPU 901 by operating an operation unit 904 including a keyboard and a mouse.

A display unit 905 including a CRT or a liquid crystal panel can display the process result of the CPU 901 by an image or a text.

The external storage device 906 is a large-capacity storage device represented by a hard disk drive device. The external storage device 906 stores the OS (Operating System), and programs (e.g., the CG software that forms the CG rendering unit 101 and programs that implement the viewpoint calculation unit 103 and conversion unit 105) and data (e.g., data to render virtual objects included in the virtual space) to make the CPU 901 execute the process (to be described later) to be executed by the computer. The programs and data are loaded to the RAM 902, as needed, under the control of the CPU 901 and processed by the CPU 901.

The I/F 907 functions as an interface to connect the control box 801 to the computer. Any other device may be connected to the I/F 907.

A bus 908 connects the above-described units.

Figure 2:
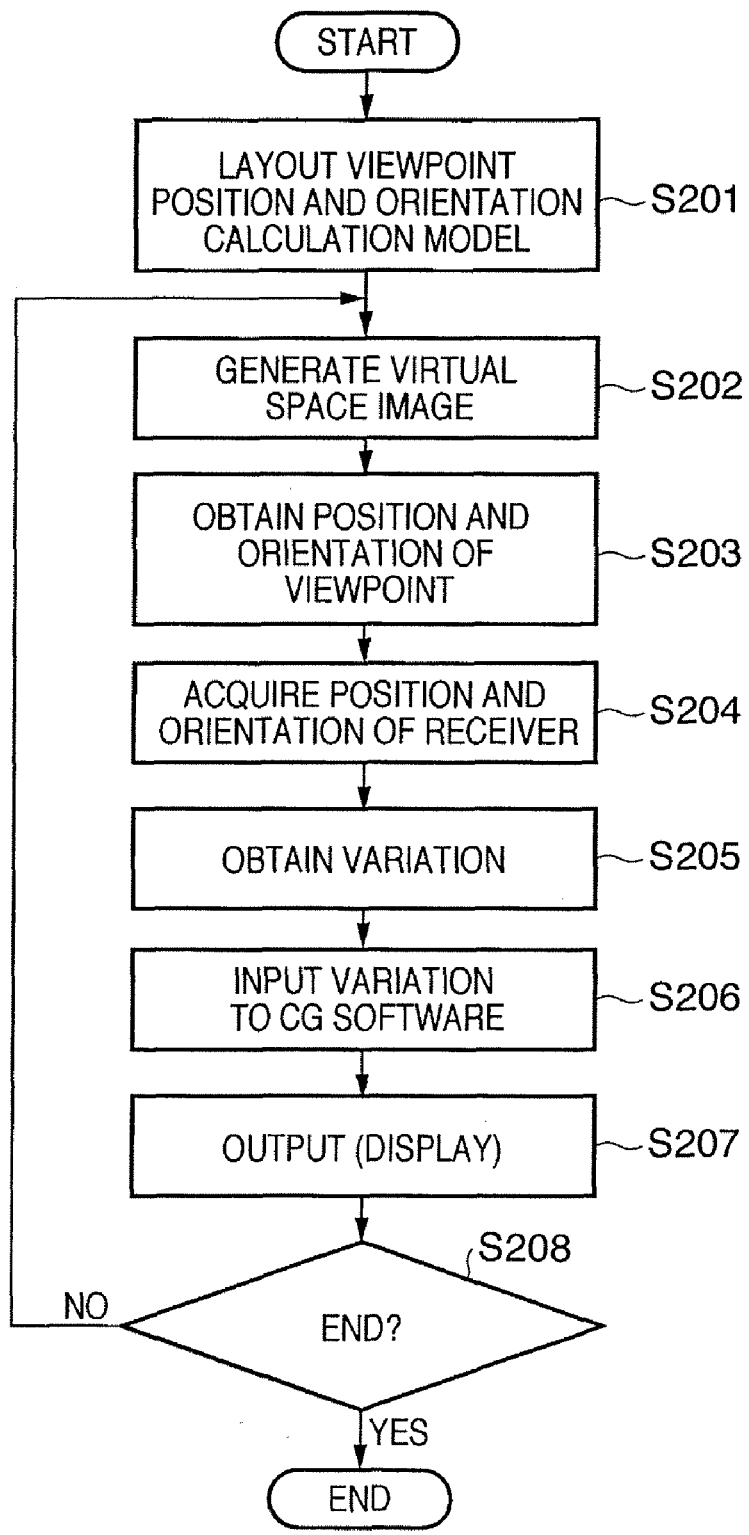
FIG. 2 is a flowchart showing a process of implementing a VR system by using the system with the above arrangement while utilizing conventional CG software as a CG rendering unit.

A process of implementing a VR system by using the system with the above arrangement while utilizing conventional CG software as a CG rendering unit will be described below with reference to FIG. 2 which shows a flowchart of the process. The external storage device 906 saves the program and data to make the CPU 901 execute the process of the flowchart in FIG. 2. The program and data are loaded into the RAM 902 under the control of the CPU 901. The computer executes the each process to be described below by causing the CPU 901 to execute the process by using the loaded program and data.

In step S201, the data of a virtual object (viewpoint position and orientation calculation model) to be used to obtain the position and orientation of a viewpoint set in the virtual space is loaded from the external storage device 906 to the RAM 902. A viewpoint position and orientation calculation model is generated by using the loaded data and arranged in the virtual space.

Figure 5:
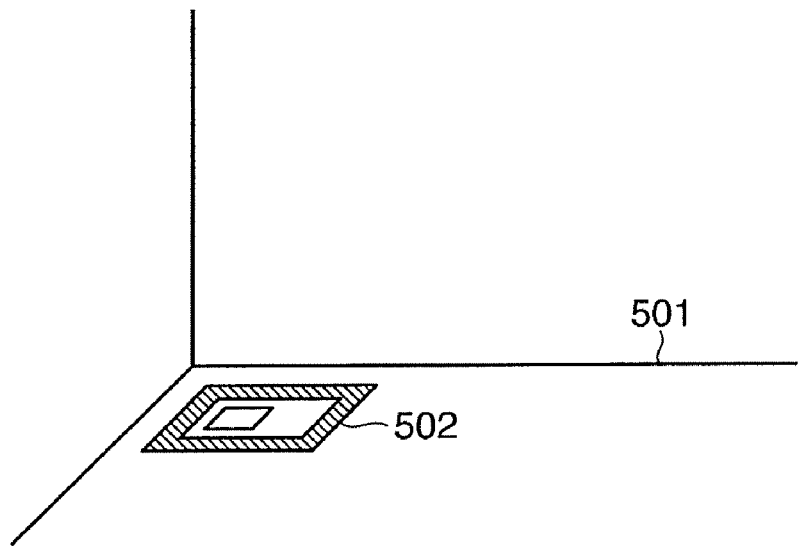
FIG. 5 is a view showing a viewpoint position and orientation calculation model in a virtual space.

FIG. 5 is a view showing a viewpoint position and orientation calculation model in a virtual space. Referring to FIG. 5, a coordinate system (virtual space coordinate system) 501 is set in the virtual space, in advance. The virtual space coordinate system defines a predetermined point in the virtual space as the origin and three axes perpendicularly crossing each other at the origin as the X-, Y-, and Z-axes.

In FIG. 5, a viewpoint position and orientation calculation model 502 is set at a predetermined position (known position) in the coordinate system. In this embodiment, a rectangular plate having a texture of a predetermined pattern on its surface is used as the viewpoint position and orientation calculation model. However, the viewpoint position and orientation calculation model is not limited to this. In addition, two or more viewpoint position and orientation calculation models may be used.

Referring back to FIG. 2, in step S202, a virtual object that is preset as a layout target, or a virtual object as the target of a layout instruction input by the operator via the operation unit 904 is laid out in the virtual space.

Figure 6:
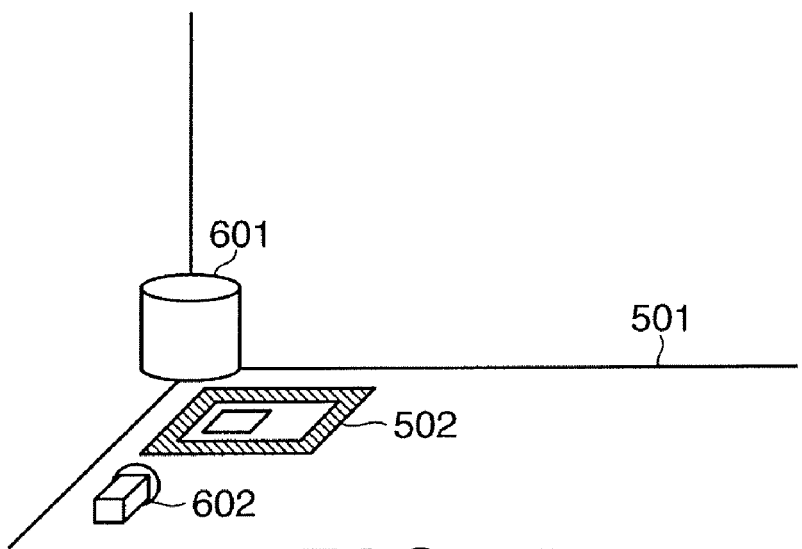
FIG. 6 is a view showing a virtual space formed by laying out a virtual object in the virtual space shown in FIG. 5.

FIG. 6 is a view showing a virtual space formed by laying out a virtual object in the virtual space shown in FIG. 5. The same reference numerals as in FIG. 5 denote the same parts in FIG. 6. Referring to FIG. 6, reference numeral 601 denotes a virtual object that is preset as a layout target, or a virtual object as the target of a layout instruction input by the operator via the operation unit 904. A viewpoint (virtual camera) 602 is set to generate the image of the virtual space.

Figure 7:
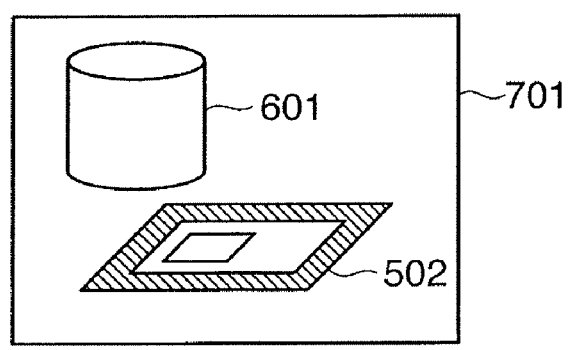
FIG. 7 is a view showing a virtual space image obtained by viewing the virtual space shown in FIG. 6 from a viewpoint 602.

In step S202, furthermore, the image of the virtual space viewed from the set viewpoint (viewpoint 602 in FIG. 6) is generated as a virtual space image. FIG. 7 is a view showing a virtual space image obtained by viewing the virtual space shown in FIG. 6 from the viewpoint 602. As shown in FIG. 7, the virtual object 601 and viewpoint position and orientation calculation model 502 viewed from the viewpoint 602 are rendered in a virtual space image 701.

The process described above is, in steps S201 and S202, performed by executing general CG software using the data of the viewpoint position and orientation calculation model and virtual object as a layout target.

In step S203, the position and orientation of the viewpoint used to generate the virtual space image are obtained by using the virtual space image generated in step S202. Generally, when an image of a space in which a plurality of feature points with known three-dimensional positions are laid out is captured, the position and orientation of the camera that has captured the image can be obtained by using the positions of the feature points in the captured image.

One viewpoint position and orientation calculation model is regarded as one feature point, and a plurality of feature points are laid out in the virtual space. Alternatively, a plurality of feature points are provided on the viewpoint position and orientation calculation model, and an image of the virtual space including the viewpoint position and orientation calculation model is generated. In this case, the position and orientation of the viewpoint used to generate the image can be obtained from the image. The technique of obtaining the position and orientation of the viewpoint of an image from the image is not particularly limited, and various techniques are usable.

In this embodiment, the position and orientation of the viewpoint of the image are obtained by using the feature points in the image generated in step S202. The position and orientation of the viewpoint are those in the virtual space, as described above.

In step S204, the control box 801 inputs a signal (position and orientation information) representing the position and orientation of the receiver 803 to the computer via the I/F 907. This signal is acquired on the RAM 902 as data. The position and orientation represented by the acquired data are those in the sensor coordinate system, as described above.

In step S205, to handle the position and orientation of the viewpoint obtained in step S203 and those of the receiver 803 acquired in step S204 in the same space, one or both of the pieces of information are converted. For example, to handle the position and orientation of the viewpoint and those of the receiver 803 as positions and orientations in the virtual space, it is necessary to convert the position and orientation of the receiver 803 into those in the virtual space. For this purpose, the position and orientation relationship between the virtual space coordinate system and the sensor coordinate system is obtained as a bias, in advance. When the bias is added to the position and orientation of the receiver 803 acquired in step S204, the position and orientation of the receiver 803 in the virtual space coordinate system can be obtained.

Alternatively, to handle the position and orientation of the viewpoint and those of the receiver 803 as positions and orientations in a world coordinate system (a coordinate system that defines a point in the physical space as the origin and three axes perpendicularly crossing each other at the origin as the X-, Y-, and Z-axes), the position and orientation relationship between the world coordinate system and the sensor coordinate system is obtained as bias 1, and the position and orientation relationship between the world coordinate system and the virtual space coordinate system is obtained as bias 2, in advance. When the bias 1 is added to the position and orientation of the receiver 803 acquired in step S204, the position and orientation of the receiver 803 in the world coordinate system can be obtained. When the bias 2 is added to the position and orientation of the viewpoint obtained in step S203, the position and orientation of the viewpoint in the world coordinate system can be obtained.

In this way, the process so as to handle the position and orientation of the viewpoint obtained in step S203 and those of the receiver 803 acquired in step S204 in the same space is executed. Any process accomplishing this purpose can be employed.

In step S205, furthermore, a variation (differential vector) is obtained by subtracting a vector indicating the position and orientation (obtained or converted in step S203) of the viewpoint from a vector indicating the position and orientation (obtained or converted in step S204) of the receiver 803.

In step S206, the variation is input to the CG software as the variation of the position and orientation of the viewpoint. Hence, the CG software updates the position and orientation of the viewpoint by using the received variation and generates a virtual space image viewed for the viewpoint with the updated position and orientation, as usual.

In step S207, the virtual space image generated by the CG software upon receiving the variation in step S206 is output to the display unit 905. The display unit 905 displays, on its screen, the virtual space image viewed from the viewpoint whose position and orientation change as the receiver 803 moves. When the display unit 905 is used as the display device of an HMD, the system forms a VR system.

In step S208, it is determined whether a process end instruction has been input via the operation unit 904, or a condition to finish the process is satisfied. If it is determined not to end the process, the process returns to step S202 to execute the same process as described above.

In this embodiment, the receiver 803 is used as a tool to designate the position and orientation of the viewpoint. The position and orientation may be designated directly by using a keyboard or a mouse, and any other tool may be used.

In this embodiment, image processing is implemented in software. However, dedicated hardware may, instead, be installed in the computer 900 to execute image processing by the dedicated hardware.

In place of the above-described CG software, CG software may be used which changes the position and orientation of a viewpoint by inputting not the variation but the very position and orientation. The position and orientation of a viewpoint set by the CG software in the virtual space in order to generate a virtual space image cannot be acquired from the software.

In this case, the difference between the position and orientation (or converted position and orientation) of the viewpoint acquired from the virtual space image and the position and orientation (or converted position and orientation) of the receiver 803 is added to the position and orientation of the viewpoint acquired from the virtual space image, thereby obtaining a new position and orientation of the viewpoint. The new position and orientation of the viewpoint are input to the CG software.

Second Embodiment

The system according to the first embodiment is a VR system. When components to capture a physical space image, composite the captured image with a virtual space, and present the composite image are added to the system, an MR system can be constructed.

Figure 3:
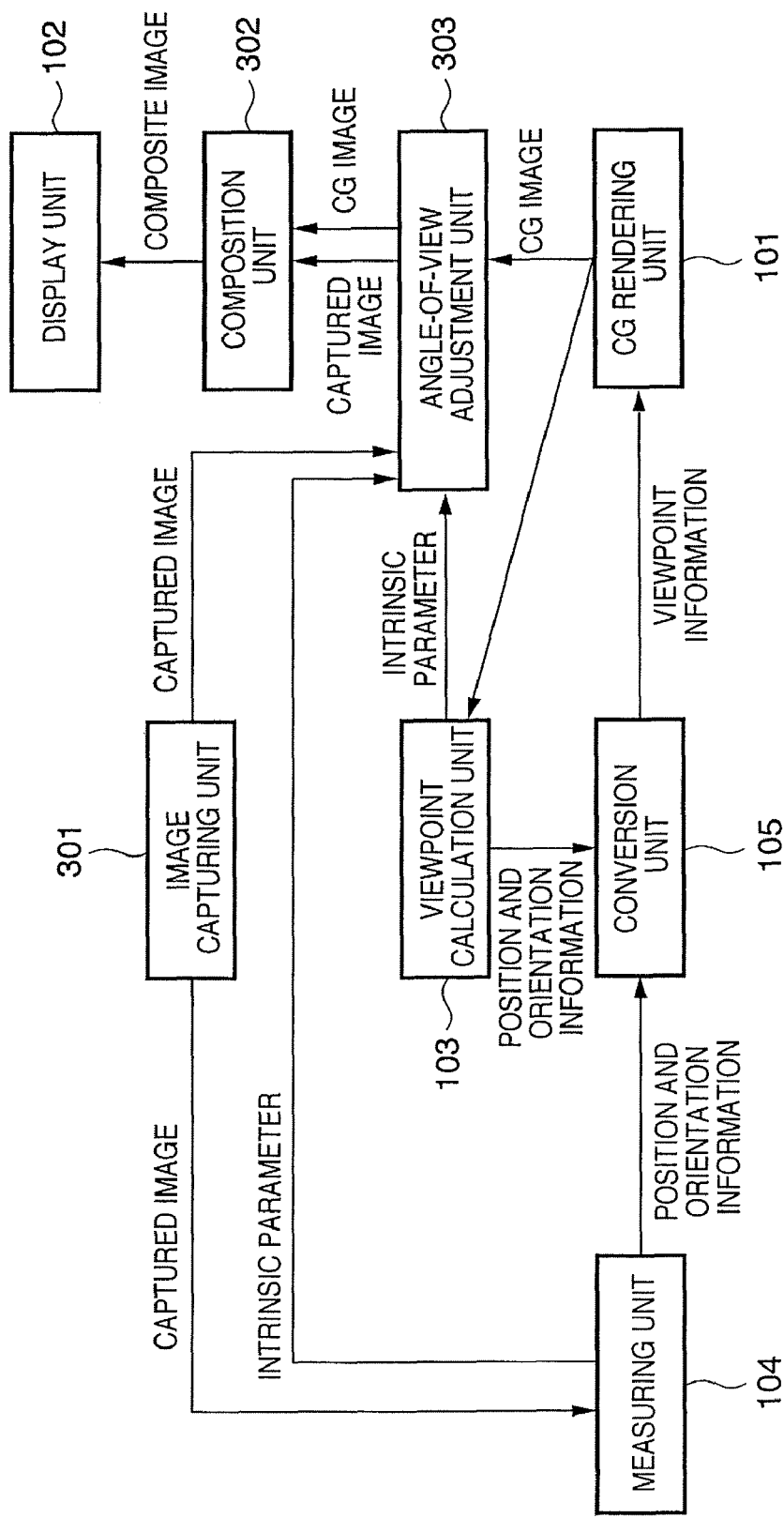
FIG. 3 is a block diagram showing the functional arrangement of an MR system according to the second embodiment of the present invention.

FIG. 3 is a block diagram showing the functional arrangement of an MR system according to this embodiment. The same reference numerals as in FIG. 1 denote the same parts in FIG. 3, and a description thereof will be omitted. The arrangement shown in FIG. 3 is formed by adding an image capturing unit 301, composition unit 302, and angle-of-view adjustment unit 303 to the arrangement shown in FIG. 1.

A viewpoint calculation unit 103 of this embodiment obtains camera parameters such as the focal length of the viewpoint and a lens distortion coefficient in addition to the position and orientation of the viewpoint. The obtained camera parameters are sent to the angle-of-view adjustment unit 303 as intrinsic parameters.

A measuring unit 104 of this embodiment obtains the position and orientation of the viewpoint of the image capturing unit 301 on the basis of an image captured by the image capturing unit 301. The image capturing unit 301 captures a moving image of the physical space. Each captured frame image (physical space image) is sent to the angle-of-view adjustment unit 303 and measuring unit 104. The measuring unit 104 obtains the position and orientation of the viewpoint of the image capturing unit 301 from the received physical space image. The process of obtaining the position and orientation of the viewpoint of a camera that has captured the physical space by using a physical space image including a plurality of feature points with known positions and orientations can be performed using a known technique, and a description thereof will be omitted. The particular process of obtaining the position and orientation of the viewpoint of the image capturing unit 301 is not limited, and various methods are usable.

The measuring unit 104 obtains the camera parameters of the image capturing unit 301 in addition to the position and orientation of the viewpoint. The obtained camera parameters are sent to the angle-of-view adjustment unit 303 as intrinsic parameters.

The angle-of-view adjustment unit 303 receives the intrinsic parameters output from the viewpoint calculation unit 103 and those output from the measuring unit 104 and adjusts the physical space image received from the image capturing unit 301 or a virtual space image generated by a CG rendering unit 101 so as that the angle of view of the viewpoint of the virtual space image matches that of the physical space image obtained by the image capturing unit 301.

The angle-of-view adjustment unit 303 inputs the physical space image and virtual space image to the composition unit 302. The composition unit 302 generates a known mixed reality space image by compositing the physical space image with the virtual space image and sends the mixed reality space image to a display unit 102.

FIG. 10 is a block diagram showing the hardware configuration of the system according to the second embodiment. As shown in FIG. 10, the system of this embodiment includes a computer 900 and a camera 1000. The computer 900 has been described in the first embodiment. The camera 1000 will be described below. The camera 1000 corresponding to the image capturing unit 301 captures a moving image of the physical space. Each captured frame image is sent to a RAM 902 in the computer 900 or an external storage device 906 via an I/F 907.

A process of implementing an MR system by using the system with the above arrangement while utilizing conventional CG software as a CG rendering unit will be described below with reference to FIG. 4 which shows the flowchart of the process. The external storage device 906 stores the program and data to make a CPU 901 execute the process of the flowchart in FIG. 4. The program and data are loaded to the RAM 902 under the control of the CPU 901. The computer executes the process to be described below by causing the CPU 901 to execute the process by using the loaded program and data.

Figure 4:
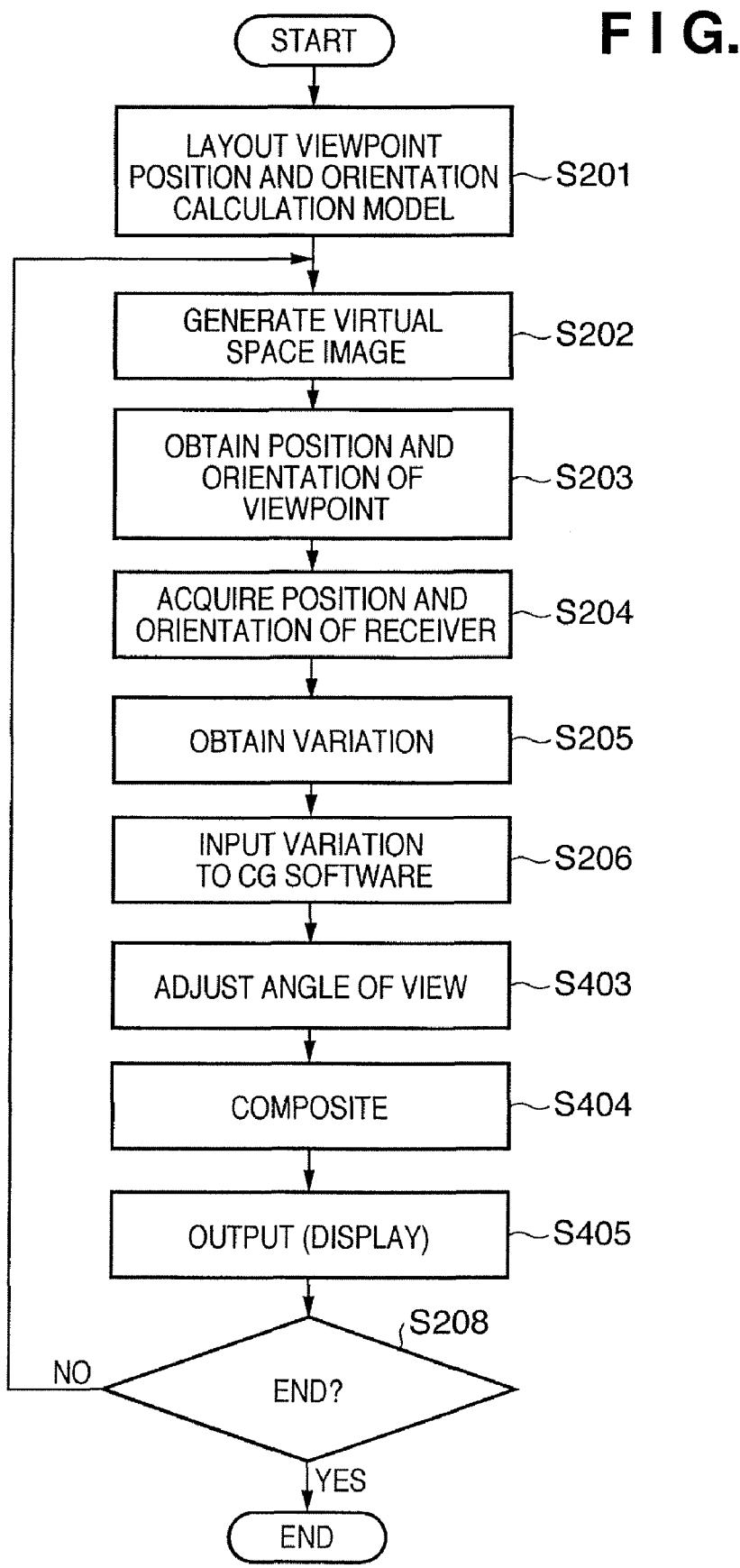
FIG. 4 is a flowchart showing a process of implementing an MR system by using the system with the above arrangement while utilizing conventional CG software as a CG rendering unit.

Steps S201 to S206 shown in FIG. 4 are the same as in the first embodiment except regarding the points to be described below.

In step S203, in addition to the position and orientation of the viewpoint, camera parameters such as the focal length of the viewpoint and a lens distortion coefficient are obtained as intrinsic parameters. A bundle adjustment method is known as a method of simultaneously obtaining the position and orientation and the intrinsic parameters.

In step S204, the position and orientation of the viewpoint of the camera 1000 are obtained from the physical space image obtained by the camera 1000. In addition, the camera parameters of the camera 1000 are obtained.

In step S403, the angle of view of the viewpoint of the virtual space image is obtained by using the intrinsic parameters obtained in step S203. In addition, the angle of view of the viewpoint of the camera 1000 is obtained by using the intrinsic parameters obtained in step S204. If the angles of view do not match, the angle of view of the physical space image is made to match that of the virtual space image by clipping the image with the larger angle of view.

In this embodiment, the angles of view of the images are made to match by image clipping. However, the method of making the angles of view match is not limited to this. For example, the angle of view of a captured image may be adjusted by changing the zoom value of the lens of the camera 1000. If the CG software has a setting window about the viewpoint, the angle of view of the viewpoint may be adjusted on the setting window. In this case, the angle of view may be adjusted automatically by, for example, a computer program or manually by the user with help of a computer program.

In step S404, a mixed reality space image is generated by compositing the thus obtained physical space image and virtual space image. Various techniques can be used to composite images. An example is chroma keying.

Chroma keying will be described on the basis of the example of the virtual space image shown in FIG. 7. In a virtual space image 701, a specific color is assigned upon rendering in a display area with the exception of virtual objects 601 and 502. In compositing the physical space image with the virtual space image 701, the physical space image is composited only in the display area with the specific color. With the above processing, it can be obtained a composite image including the physical space image as the background image and the virtual space image as the foreground image.

Another example of a composition method is depth keying. To use this composition method, a depth camera capable of acquiring the depth of the image capturing target must be used as the camera 1000. An example of the depth camera is the Zcam available from 3DV Systems in Israel. In addition, each pixel of the generated virtual space image must contain depth information.

In depth keying, depth values added to pixels are compared between corresponding pixels of the images to be composited. A pixel with a smaller depth value is selected as a display target. With the above processing, it can be obtained a composite image including the physical space image as the background image and the virtual space image as the foreground image, as in chroma keying.

In step S404, the qualities of the physical space image and virtual space image may be adjusted by processing one or both of them. For example, when the brightness of the virtual space image is adjusted so as that the brightness matches that of the physical space image, and then composes, the sense of incongruity in the composite image can be reduced.

In addition, the time delay between the physical space image and the virtual space image may be adjusted by compositing them in consideration of the image capturing timing and rendering timing. For example, several frames of a physical space image acquired by the camera 1000 are held in the external storage device 906. Once the virtual space image is generated, a physical space image that is acquired by the camera 1000 and held at the timing closest to the acquisition timing of the position and orientation of the viewpoint used to generate the virtual space image is selected as a target to be composited with the virtual space image.

In step S405, the composite image is output to the display unit 905. The display unit 905 displays the composite image on its screen. When the display unit 905 is used as the display device of an HMD, the system forms an MR system.

In this embodiment, image processing is implemented in software. However, dedicated hardware may, instead, be installed in the computer 900 to execute image processing by the dedicated hardware.

The techniques according to the first and second embodiments are usable in various fields which use CG. They can be used, for example, in industrial design (including product design evaluation), entertainment devices such as game and amusement machines, simulation apparatuses for architecture and medical care, business applications (in assistant of maintenance, for example), and broadcast-related applications (in weather forecasts, for example).

Other Embodiments

The object of the present invention is also achieved by the following method. A recording medium (or storage medium) which records software program codes to implement the functions of the above-described embodiments is supplied to a system or apparatus. The computer (or CPU or MPU) of the system or apparatus reads out and executes the program codes stored in the recording medium. In this case, the program codes read out from the recording medium themselves implement the functions of the above-described embodiments. The recording medium that records the program codes constitutes the present invention.

When the computer executes the readout program codes, the operating system (OS) running on the computer partially or wholly executes actual processing on the basis of the instructions of the program codes, thereby implementing the functions of the above-described embodiments.

The program codes read out from the recording medium are written to the memory of a function expansion card inserted into the computer or a function expansion unit connected to the computer. The CPU of the function expansion card or function expansion unit partially or wholly executes actual processing on the basis of the instructions of the program codes, thereby implementing the functions of the above-described embodiments.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-124329, filed Apr. 27, 2006, which is hereby incorporated by reference herein in its entirety.

What is claimed is:

1. An information processing method executed by an information processing apparatus for executing software which generates an image of a virtual space on the basis of a viewpoint set in the virtual space and receives a variation upon changing a position and orientation of the viewpoint, comprising:
   a first calculation step of generating an image of a virtual space including a feature point by executing the software and obtaining a first position and orientation of the viewpoint by using the generated virtual space image;
   a designation step of designating a second position and orientation of the viewpoint;
   a second calculation step of obtaining a variation of the viewpoint on the basis of the second position and orientation designated in the designation step and the first position and orientation obtained in the first calculation step;
   an input step of inputting the variation of the viewpoint obtained in the second calculation step to the software to update the first position and orientation of the viewpoint; and
   an output step of outputting a virtual space image generated on the basis of a viewpoint having the first position and orientation that were updated by the software on the basis of the variation obtained in the second calculation step.

2. The method according to claim 1, wherein, in the designation step, a user designates a position and orientation of a manipulation tool whose position and orientation can be manipulated.

3. The method according to claim 1, wherein the second calculation step comprises:
   a conversion step of converting the second position and orientation designated in the designation step and/or the first position and orientation obtained in the first calculation step to handle the positions and orientations in the same space; and
   a step of obtaining, as the variation, a difference between the second position and orientation designated in the designation step or a position and orientation obtained by converting the second position and orientation in the conversion step, and the first position and orientation obtained in the first calculation step or a position and orientation obtained by converting the first position and orientation in the conversion step.

4. An information processing apparatus for executing software which generates an image of a virtual space on the basis of a viewpoint set in the virtual space and receives a variation upon changing a position and orientation of the viewpoint, comprising:
- first calculation unit adapted to generate an image of a virtual space including a feature point by executing the software and to obtain a first position and orientation of the viewpoint by using the generated virtual space image;
- designation unit adapted to designate a second position and orientation of the viewpoint;
- second calculation unit adapted to obtain a variation of the viewpoint on the basis of the second position and orientation designated by said designation unit and the first position and orientation obtained by said first calculation unit;
- input unit adapted to input the variation of the viewpoint obtained by said second calculation unit to the software to update the first position and orientation of the viewpoint; and
- output unit adapted to output a virtual space image generated on the basis of a viewpoint having the first position and orientation that were updated by the software on the basis of the variation obtained by said second calculation unit.

5. A computer-readable non-transitory storage medium for storing a program which causes a computer to execute an information processing method of claim 1.

6. An information processing method executed by an information processing apparatus for executing software which generates an image of a virtual space on the basis of a viewpoint set in the virtual space and receives a designation of a position and orientation upon designating a position and orientation of the viewpoint, comprising:
- a first calculation step of generating an image of a virtual space including a feature point by executing the software and obtaining a first position and orientation of the viewpoint by using the generated virtual space image;
- a designation step of designating a second position and orientation of the viewpoint;
- a second calculation step of obtaining a new position and orientation of the viewpoint on the basis of the second position and orientation designated in the designation step and the first position and orientation obtained in the first calculation step;
- an input step of inputting the new position and orientation obtained in the second calculation step to the software to update the first position and orientation of the viewpoint to be the new position and orientation; and
- an output step of outputting a virtual space image generated on the basis of a viewpoint having the first position and orientation that were updated by the software on the basis of the new position and orientation obtained in the second calculation step.

7. The method according to claim 6, wherein the second calculation step comprises:
- a conversion step of converting the second position and orientation designated in the designation step and/or the first position and orientation obtained in the first calculation step to handle the positions and orientations in the same space; and
- a step of obtaining, as the variation, a difference between the second position and orientation designated in the designation step or a position and orientation obtained by converting the second position and orientation in the conversion step, and the first position and orientation obtained in the first calculation step or a position and orientation obtained by converting the first position and orientation in the conversion step, and obtaining the new position and orientation on the basis of the variation.

8. The method according to claim 1, further comprising an acquisition step of acquiring an image of a physical space seen from the viewpoint,
wherein, in the output step, the virtual space image is composited with the physical space image acquired in the acquisition step and then is output.

9. An information processing apparatus for executing software which generates an image of a virtual space on the basis of a viewpoint set in the virtual space and receives a designation of a position and orientation upon designating a position and orientation of the viewpoint, comprising:
- first calculation unit adapted to generate an image of a virtual space including a feature point by executing the software and to obtain a first position and orientation of the viewpoint by using the generated virtual space image;
- designation unit adapted to designate a second position and orientation of the viewpoint;
- second calculation unit adapted to obtain a new position and orientation of the viewpoint on the basis of the second position and orientation designated by said designation unit and the first position and orientation obtained by said first calculation unit;
- input unit adapted to input the new position and orientation obtained by said second calculation unit to the software to update the first position and orientation of the viewpoint; and
- output unit adapted to output a virtual space image generated on the basis of a viewpoint having the first position and orientation that were updated by the software on the basis of the new position and orientation obtained by said second calculation unit.

* * * * *